United States Patent
Lindlar

(10) Patent No.: US 6,807,408 B2
(45) Date of Patent: Oct. 19, 2004

(54) METHOD FOR INTERRUPTING AN IDLE STATE OF A COMMUNICATION UNIT IN A RADIO COMMUNICATION SYSTEM

(75) Inventor: Heribert Lindlar, Bochum (DE)

(73) Assignee: Nokia Mobile Phones, Ltd., Espoo (FI)

( * ) Notice: Subject to any disclaimer, the term of this patent is extended or adjusted under 35 U.S.C. 154(b) by 587 days.

(21) Appl. No.: 09/794,272

(22) Filed: Feb. 27, 2001

(65) Prior Publication Data

US 2001/0027096 A1 Oct. 4, 2001

(30) Foreign Application Priority Data

Feb. 29, 2000 (DE) .......................................... 100 09 683

(51) Int. Cl.[7] ................................................. H04B 1/16
(52) U.S. Cl. ..................... 455/343.2; 455/574; 370/311
(58) Field of Search ............................. 455/574, 343.1, 455/343.2; 370/311, 312, 313

(56) References Cited

U.S. PATENT DOCUMENTS

| | | | |
|---|---|---|---|
| 5,428,820 A | | 6/1995 | Okada et al. ............... 455/38.3 |
| 5,487,181 A | | 1/1996 | Dailey et al. .................. 455/89 |
| 5,950,120 A | * | 9/1999 | Gardner et al. ........... 455/343.1 |
| 5,995,820 A | * | 11/1999 | Young et al. ............. 455/343.1 |
| 6,029,061 A | * | 2/2000 | Kohlschmidt ................ 455/574 |
| 6,088,602 A | * | 7/2000 | Banister ...................... 455/574 |
| 6,411,830 B2 | * | 6/2002 | Alon et al. .................. 455/574 |

FOREIGN PATENT DOCUMENTS

| | | |
|---|---|---|
| DE | 3780531 T2 | 2/1993 |
| EP | 0256594 A2 | 2/1988 |
| EP | 0726687 A1 | 8/1996 |
| EP | 0 865 167 | 9/1998 |

\* cited by examiner

Primary Examiner—Edward F. Urban
Assistant Examiner—Blane J. Jackson
(74) Attorney, Agent, or Firm—Perman & Green LLP

(57) ABSTRACT

The invention relates to a method for interrupting an idle state of a communication unit in a communication system, especially in a radio communication system. To keep the response time of a communication unit operating in a standby mode as short as possible following a user input, it is provided according to the invention that, in response to an interrupt request, the time still remaining to the next activation is reduced to a time which is sufficient for preparing the activation if the time still remaining is greater than a predetermined time.

8 Claims, 2 Drawing Sheets

Figure 1:
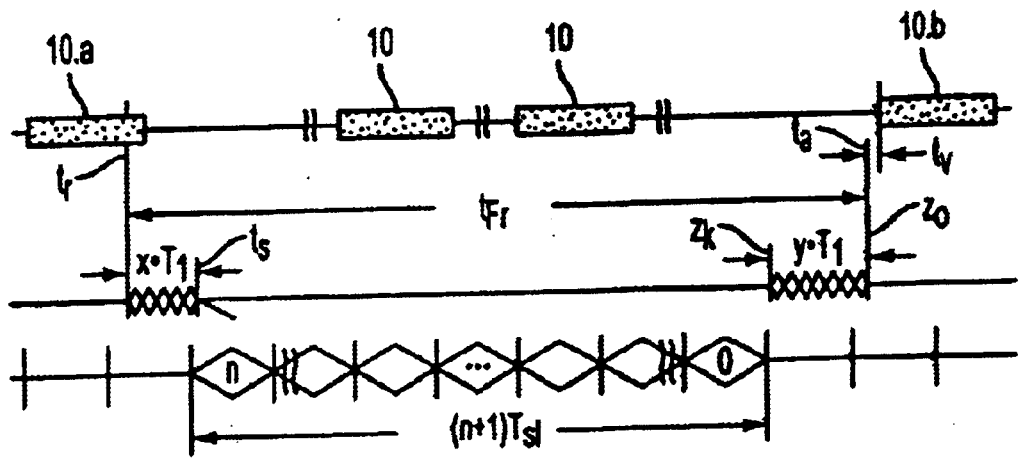

METHOD FOR INTERRUPTING AN IDLE STATE OF A COMMUNICATION UNIT IN A RADIO COMMUNICATION SYSTEM

The invention relates to a method for interrupting an idle state of a communication unit in a communication system, especially in a radio communication system.

A decisive factor in systems which must only exhibit a low power requirement as, for example, in mobile radio, is to save energy whenever possible. In digital ASICs (application-specific integrated circuits) this can be done, for example, by switching off as many loads as possible, especially as many clock generators and associated counters or frequency dividers as possible, during pauses in activities.

To keep frame synchronization to the base station or to the main unit, respectively, in digital mobile radio communication systems such as the GSM (global system for mobile communication) or low-power local radio interface systems in a mobile station or subunit, respectively, it is necessary to keep frame counters running continuously. The clock for the frame counters is usually supplied by a fast, highly accurate crystal oscillator which, for example, operates at a frequency of 13.0 MHz in GSM. If frame synchronization is not maintained, complete resynchronization is necessary at the beginning of each activity phase which, however, consumes a lot of power.

To achieve standby times of the mobile stations or, respectively, subunits which are as long as possible, it is already known also to switch off the fast oscillator and frame counters in the pauses between activities. During these idling phases, a slow oscillator with an associated counting stage then maintains synchronization to the base station or main unit.

In a mobile telephone known from EP 0 726 687 A1, a fast, highly accurate oscillator which supplies a clock signal at 16.8 MHz is provided for the frame synchronization. Synchronization signals for subframes, frames and superframes which in each case consist of 36 frames are generated via a cascade of counters or frequency dividers and supplied to a processor of the mobile telephone which is clocked by the fast oscillator. During an idle state, the fast oscillator and the associated frame counters are deactivated and the time of the next activation of the mobile telephone is maintained with the aid of an inexpensive, relatively slow oscillator. In this arrangement, an inexpensive 32-kHz-clock crystal, which only has extremely low power consumption within a range of a few microwatts can be used as the slow oscillator. Due to the slow clocking, the connected idle state counter also only consumes very little power.

However, since the accuracy and temperature-dependence of the slow oscillator are much worse than those of the fast oscillator, it is necessary to calibrate the slow oscillator against the fast oscillator as frequently as necessary. Furthermore, the temporal resolution of the slow oscillator with approx. 30 μs per clock period is very much worse than the about 60 ns at 16.8 MHz or the about 77 ns at 13.0 MHz of the fast oscillator.

In a known time measuring system in which a slow oscillator is used in addition to a fast, highly accurate oscillator, the slow oscillator is calibrated against the fast oscillator in order to determine the frequency ratio between the fast clock and the slow idle state clock. Knowing the calibration value and the duration of a time interval, that is to say, for example, the pause in activity up to a next burst to be expected, the duration of the time interval can then be measured in three sections. From the beginning of the time interval up to the first active edge of the slow clock pulse, the time is determined with the aid of the fast clock. In a second section, in which the fast oscillator is switched off in order to save energy, the time measurement is performed with the aid of the slow clock. At the end of the second section, the system switches back to the fast clock in order to be able to determine the end of the time interval with the high resolution provided by the fast oscillator.

Accordingly, the mobile control unit (MCU) of a mobile telephone or of a subunit of a radio communication system operating at low power is thus capable of calculating the number of required slow idle state clock pulses up to the expected burst to be monitored from the calibration value for the frequency ratio between fast reference clock and slow idle state clock and the time to be expected up to the next burst which is to be monitored. At a defined time at the end of the last received burst before the beginning of the idle phase, the state of the fast frame counter is then registered. This is done in the correct phase with the active edge of the slow idle state clock at the start of an idle state counter with the calculated starting value n which counts down to the target value 0. Due to the registered counts of the frame counters, the mobile control unit is able to calculate the count with which the frame counters must be preloaded synchronously to the active edge of the idle state clock after the idle state counter has run down so that it can hit the timing pattern of the base station or, respectively, the main unit again with an accuracy of a few bits.

Thus, the energy consumption during idle state phases can be distinctly reduced in this manner.

In systems such as radio communication systems with low transmitting power which are optimized to the consumption of particularly little energy, the idle state periods are very much longer than e.g. in GSM. The idle state period can last several seconds in this case.

A request by the user, e.g. by depressing a key, immediately wakes up a subunit. In consequence, the fast oscillator is started and the mobile control unit (MCU) switched on after waiting for the settling time to elapse. The mobile control unit can respond immediately with local responses, e.g. on a display device. However, if the request occurs shortly after the beginning of a sleep period, the exchange of data with the base station or main station must wait until the idle state period has expired. This delay is too long in many applications and not acceptable to the user.

The invention is based on the object of providing a method for interrupting an idle state of a communication unit in a communication system, especially in a radio communication system, which guarantees a fast response of the system to a request by the user at any time.

This object is achieved by the method as claimed in claim 1.

According to the invention, therefore, the time still remaining to the next activation of the system is reduced following an interrupt request which occurs during an idle state, in such a manner that the reduced remaining time is sufficient for preparing the activation. This makes it possible to shorten the idle state time drastically following an interrupt request without losing synchronization between the communication unit and its base station or main station. Before the remaining time is reduced, a check is suitably made whether this remaining time is greater than a predetermined time so that the remaining time is only reduced if the time still remaining when the interrupt request occurs is greater than a predetermined value.

In the simplest case, it can be provided that the time remaining following an interrupt request is set to a predetermined short time which is sufficient for preparing the activation.

However, it is especially advantageous if the time still remaining is established in order to determine therefrom a subtraction value by which the time still remaining is reduced. This procedure has the advantage that all necessary actions can be performed between when the time still remaining is established and the reduced time is set without there being a possibility of problems being caused by time delays.

The time still remaining of an idle state is suitably detected as count of an idle state counter of a timer circuit, the count of which is set to a count which is closer to the target value in order to reduce further the time still remaining.

In this arrangement, the idle state counter is advantageously a counter which is clocked by a relatively slow clock and which, together with a frame counter clocked by a faster clock, establishes the total idle state period, the frame counter establishing the idle state time remaining to the activation of the communication unit after the idle state counter has elapsed, and that, after the idle state counter has been set to a new count, the starting count of the frame counter is reset, the new starting count being calculated in dependence on the shortening of the idle state time.

Figure 2:
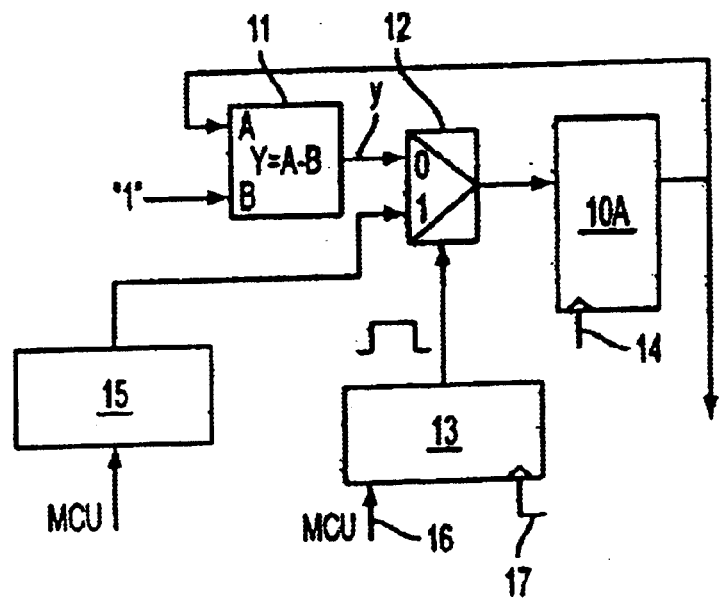
Figure 3:
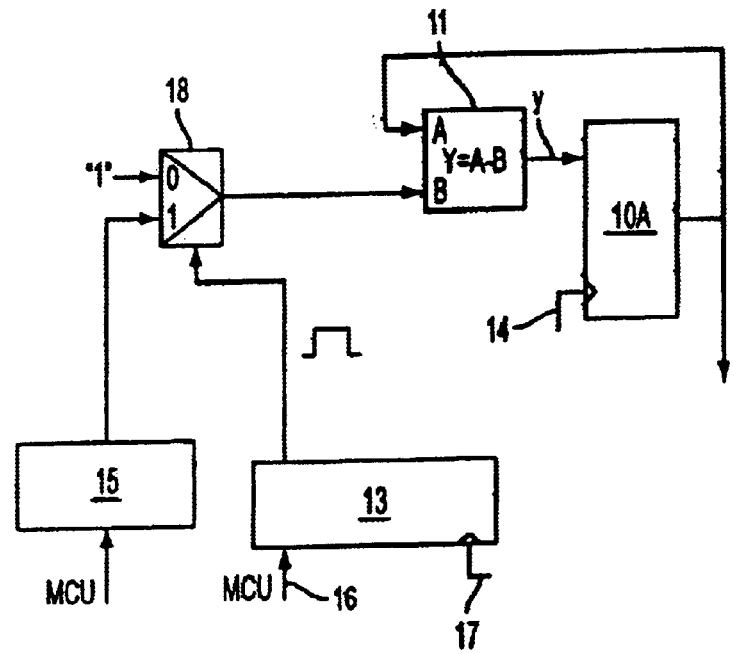
Figure 4:
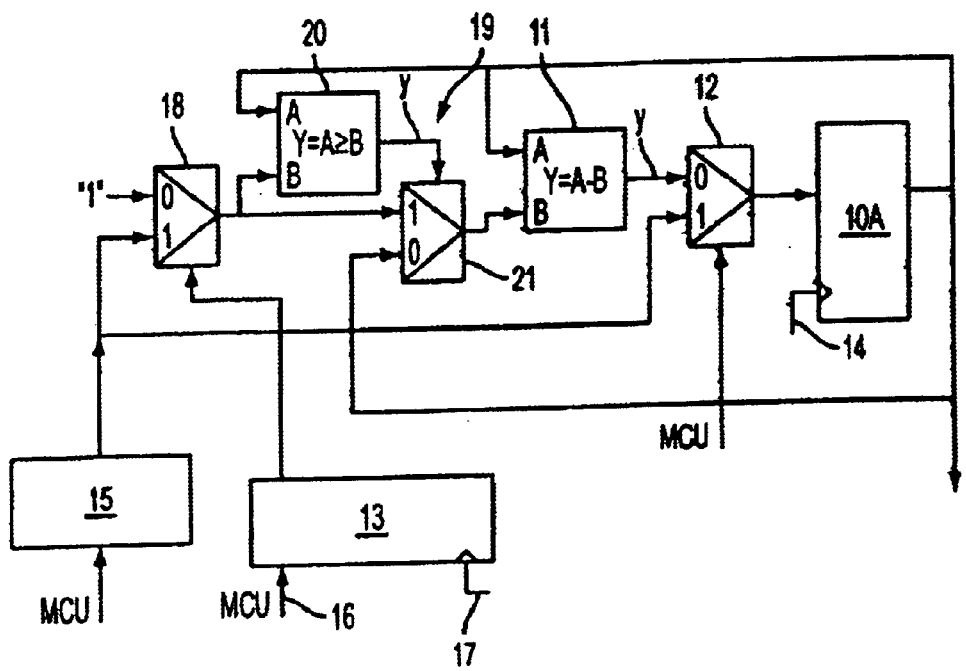

In the text which follows, the invention will be explained in greater detail by way of example and referring to the drawing, in which:

FIG. 1 shows a simplified timing diagram for illustrating the idle state period detection in the method according to the invention, FIG. 2 shows a simplified block diagram of a first idle state counter circuit for carrying out the method according to the invention, FIG. 3 shows a simplified block diagram of a second idle state counter circuit for carrying out the method according to the invention, and FIG. 4 shows a detailed block diagram of the idle state counter circuit according to FIG. 3.

In the various figures of the drawing, circuit elements which correspond to one another are provided with the same reference symbols.

In communication systems, especially in radio communication systems, information and data are exchanged between a mobile station and a base station or between a slave or substation and an associated master or main station by means of a frame structure in which a frame exhibits a certain length in time and is subdivided into a multiplicity of time slots in order to enable a number of transmitting and receiving channels to be built up in the so-called time division multiplex axis (TDMA) method so that a plurality of mobile or slave stations can communicate with an associated base station or master station.

In this arrangement, each slave station is allocated one time slot for receiving data from the master station and one time slot for transmitting data to the master station.

In standby mode, that is to say when there is no communication, the slave station only needs to be active during the time slots associated with the receiving channel, in which a burst can be received and during the remaining time, the slave station can be placed into an idle state in which the mobile control unit MCU, a fast, highly accurate oscillator for generating a fast clock which has, for example, a frequency of 13.0 MHz, and the associated frame counters are switched off whilst the idle state period is detected by an idle state counter which is clocked by a slow oscillator, for example by a clock crystal which is operated at a frequency of about 32 768 Hz.

To illustrate the synchronization of a communication unit, especially a slave station, received bursts 10 are shown in the time slots assigned to their receiving channel in FIG. 1. In principle, it is conceivable that the communication unit is displaced into an idle state at the end of each burst 10 in order to be activated again before the arrival of the next burst, that is to say before the beginning of the next time slot allocated to the receiving channel. In FIG. 1, however, the case is shown that the communication unit is placed into an idle state for a multiplicity of frame periods in order to save as much energy as possible and to ensure the longest possible standby time with a predetermined energy source.

If a communication unit is to be placed into the idle state after the end of an activity phase, first the constant period $t_{Fr}$ between a time $t_r$ at the end of a burst 10.a to a time $t_a$ before the next burst 10.b to be monitored is determined from the frame time, the duration of a time slot and the number of frames for the duration of which the communication unit is to be placed into the idle state. The time $t_{Fr}$ can be specified as number z of periods $T_f$ of the fast clock, e.g. 1/13 MHz~77 ns.

To determine the frequency ratio k between fast clock (13 MHz) and slow clock (about 32 kHz) the time to the next burst 10.b to be monitored, that is to say the time $t_{Fr}$, and thus the time $t_a$ is determined, for example in a calibration step, by the frame counter and the fast oscillator clocking this counter continuing to run in order to output an activation signal when the count of the frame counter reaches the value $z_0$. At the same time, the idle state counter is clocked by the slow oscillator in order to count from a starting value $n_k$ for the calibration.

After the time $t_{Fr}$ has elapsed, the number of fast clock periods tf can be related to the number of slow clock periods $t_{sl}$ in order to calculate the calibration value $k=T_{sl}/T_f=f_f/f_{sl}$ (where $f_f$ is the frequency of the fast oscillator and $f_{sl}$ is the frequency of the slow oscillator). It is particularly appropriate if the count x of the fast frame counter is also registered in accurate phase with the active edge of the idle state clock pulse at the start of the idle state counter with the calibration starting value $n_k$ as also the count $z_k$ of the fast frame counter when a predetermined target value of the idle state counter is reached.

This calibration must be repeated at certain intervals in order to take into consideration long-term drifting and the temperature dependence of the slow oscillator.

The calibration value k can be used for determining the starting value n of the idle state counter when the idle state counter is a counter counting down to the target value 0. Conversely, the target value can be established in an up counter starting from 0.

In normal standby mode, the state of the fast frame counter is registered in accurate phase with the active edge of the slow idle state clock at the start of the idle state counter at time $t_s$ after a monitored burst 10.a. From the state of the frame counter at time $t_s$, the number x of periods $T_f$ of the fast clock, which has elapsed since the reference time $t_r$ at the end of the burst 10.a, is then determined. The calibration value k, the number x of periods $T_f$ of the fast clock, the starting value n, the time $t_{Fr}$ and the target count $z_0$ of the fast frame counter can be used for calculating the count $z_k$ with which the fast frame counter is started as soon as the slow idle state counter has reached its target value.

In standby mode, the fast frame counter, the count of which is registered when the idle state counter is started with the active edge of the idle state clock pulse, is started at the end of a monitored burst 10.a at time $t_r$. The idle state counter then counts down from the starting value n until the target value 0 is reached if there is no interruption. After the target value has been reached, the idle state counter outputs a starting signal for the fast frame counter which is set to the value $z_k$, in order accurately to detect the time y. $T_f$ remaining until activation of the system. As soon as the fast frame counter has then reached the count z corresponding to time $t_a$, the system is activated and switched to reception.

If a user of the communication unit operates an input key while this unit is in an idle state in standby mode, the fast oscillator is immediately started and the mobile control unit MCU is activated. Thus, all functions of the communication unit which do not require a data or information exchange with a base station can be executed. The idle state counter is then interrogated in order to detect the time remaining to the next activation at time $t_a$. If it is shorter than a predetermined value, that is to say if the count with a down-counting idle state counter is smaller than a predetermined value, the system simply waits for the time remaining to the next activation without intervening in the operation of the individual counters.

If, however, the time remaining to the activation time $t_a$ is greater than a predetermined value, the count of the idle state counter is set to a new value which corresponds to a period which is sufficient for recalculating the counts of the fast frame counters for the intended activation and loading them into the frame counter in order to reduce the remaining period.

In this arrangement, the idle state counter can be simply set to a new count which is closer to the target value by overriding the idle state counter with the new value. However, this requires that the new counts for the fast frame counter are calculated so fast that the count of the idle state counter is overwritten at the time which was stipulated in the calculation of the counts.

FIG. 2 shows a first embodiment of an idle state counter of a timer circuit in which the count can be simply overwritten with a predetermined target value which is closer to the target value in order to reduce the period. The idle state counter constructed as a down counter has a register 10 which can be constructed, for example, as a 32-bit register, and the output A of which is applied, on the one hand, to an input A of a subtractor 11 and, on the other hand, to a comparison circuit, not shown in greater detail, in order to generate activation signals for the fast oscillator and the fast frame counter.

At the second input B of the subtractor 11, the value "1" is present which is subtracted from the output value of the register 10. The output Y at which the value A-B is present, is applied to a first input 0 of a multiplexer 12 which is controlled by a synchronization circuit 13. The output of the multiplexer 12 is conducted to the input of the register 10, at the clock input 14 of which the idle state clock from the slow oscillator is applied so that the value present at the input of register 10 is switched through to its output A with each clock pulse. The count present at the output A of the register 10 is thus decremented by 1 with each clock pulse of the slow idle state clock as long as the multiplexer 12 switches the output Y of the subtractor 11 through to the input of the register 10.

A second input of the multiplexer 12 is connected to an output of a load register 15 into which the mobile control unit newly writes a count to which the register 10 of the idle state counter is to be set. The count from the load register 15 is applied to the input of the register 10 whenever the synchronization circuit 13 switches the output of the multiplexer 12 from the input 0 for normal operation to the input 1 for the loading operation.

In normal standby mode, the load register 15 is used for setting the register 10 of the idle state counter to the initial count n calculated for the idle state period following in each case.

If an interrupt request occurs during an idle state period at a time which requires the remaining idle state period to be reduced, the mobile control unit MCU loads into the load register 15 a count to which the register 10 of the idle state counter is to be set. At the same time, a load command is applied to a control input 16 of the synchronization circuit 13, at the clock input 17 of which the slow idle state clock is present. If a load command from the mobile control unit MCU is present at the control input 16 of the synchronization circuit 13, the output of the synchronization circuit 13 is switched from 0 to 1 with the next active edge of the idle state clock pulse so that the output of the multiplexer 12 is switched in synchronism with the idle state clock to the input 1 at which the value of the load register is present so that the register 10 is set to the new count in synchronism with the idle state clock.

FIG. 3 shows a further circuit arrangement of an idle state counter of a timer circuit with a register 10 and a subtractor 11, in which the output Y of the subtractor 11 is connected directly to the input of the register 10. At the second input B of the subtractor 11, at which the value to be subtracted in each case is present, the output of a multiplexer 18 is connected which is controlled by a synchronization circuit 13 in order to switch a first input 0 or a second input 1 through to the output. The first input 0 of the multiplexer 18 at which the value "1" is present is normally at its output and thus applies to the second input B of the subtractor 11 so that the count present of the output A of the register 10 is decremented by 1 with each idle state clock pulse.

If the count of the idle state counter needs to be reduced during an idle state period, the mobile control unit MCU first calculates a subtraction value from the current count of the idle state counter and the count to which the idle state counter is to be set, and loads this value into the load register 15, the output of which is present at the second input 1 of the multiplexer 18. The mobile control unit MCU thereupon outputs a subtraction signal to the control input 16 of the synchronization circuit 13, the output of which is thereupon set to 1 with the next active edge of the idle state clock pulse in order to switch the second input 1 of the multiplexer 18 to its output so that the subtraction value from the load register 15 is applied to the second input of the subtractor 11. At the output Y of the subtractor, the output count of the register 10, reduced by the subtraction value, is thus present at output Y of the subtractor as reduced count which is taken over by the register 10 with the next idle state clock pulse. The multiplexer 18 is then switched back to the normal state in which the input 0 is switched through to the output in order to decrement the idle state counter, starting from the reduced count, by 1 as usual with each idle state clock pulse.

In this case, the idle state counter is thus set to a reduced count by determining a subtraction value and subtracting it from the current count. This has the advantage that the time of the adjustment is without influence on the synchronization as long as the current count is not close to 0, i.e. as long as the current count is still greater than the subtraction value.

FIG. 4 shows a more detailed circuit of the idle state counter according to FIG. 3 in which, similarly to the idle state counter according to FIG. 2, a multiplexer 12 is connected between the output Y of the subtractor 11 and the input of the register 10, the first input 0 of which is connected to the output Y of the subtractor 11 whilst the output of the load register 15 is connected to its second input 1. Furthermore, an underrun suppression circuit 19 is provided which comprises a comparator 20 and a multiplexer 21 which is controlled by the comparator 20.

To set the idle state counter to the starting value n, the starting value n is loaded into the load register 15 by the mobile control unit MCU. Then the multiplexer 12 connected to the register 10 is switched by the MCU via a corresponding synchronization circuit in such a manner that the output of the load register 15 connected to the second input 1 of the multiplexer 12 is switched through to the input of the register 10 in order to load the starting value n into the register 10 with the next idle state clock pulse at the clock input 14 of the register 10. Then the idle state counter can be started with the next active edge of the idle state clock pulse.

During normal counting operation, the value "1" present at the first input 0 of the multiplexer 18 is applied to the second input B of the subtractor 11 via the multiplexer 21 so that the count of the register 10 is decremented by 1 with each clock pulse.

If the count needs to be reduced due to an interrupt request, the mobile control unit MCU loads a subtraction value into the load register 15 and the multiplexer 18 is switched to its second input 1 by the synchronization circuit 13 due to a subtraction command from the mobile control unit MCU so that the subtraction value from the load register 15 is present at the second input B of the subtractor 11 via the multiplexer 18 and the multiplexer 21. The count of the register 10 is then reduced by the subtraction value present at the subtractor 11 with the next idle state clock pulse in order then to continue the normal down-counting operation.

To suppress a counter underrun, that is to say to keep the counter at the value 0 as soon as the value 0 has been reached, the comparator 20 compares the count which is present at its input A from the register 10 with the value from the output of the multiplexer 18 which is present at its input B. The value present at input B is thus either the value "1" or the subtraction value from the load register 15. As long as the value present at input B of the comparator 20 is smaller than or equal to the count present at the output A of the register 10, the comparator 20 supplies a value 1 which switches the multiplexer 21 to its first input 1 so that either the value 1 or the subtraction value from the load register 15 is present at the second input B of the subtractor 11.

If the value present at the second input B of the comparator 20 becomes greater than the count from register 10 which is present at the first input A, the output Y of the comparator 20 switches to 0 and thus controls the multiplexer 21 in such a manner that its second input 0, at which the output A of the register 10 is present, is applied to the second input B of the subtractor 11 via the output. At both inputs of the subtractor 11, the same count from output A of the register 10 is then present so that the register 10 is held at 0. Continued counting of the idle state counter is thus prevented as soon as it has reached the value 0.

However, the underrun suppression circuit 19 also prevents that too great a value is applied from the load register 15 to the second input B of the subtractor which could cause a counter underrun. This is because if the value from the load register 15 is greater than the count from the register 10, the comparator 20 switches the multiplexer 21 to the second input 0 as a result of which the same output value of the register 10 is again present at both inputs of the subtractor 11 so that the register is set to 0. The underrun suppression circuit 19 thus guarantees that the idle state counter always stops at 0 and does not overrun or underrun.

The invention, therefore, enables an idle state period to be shortened in standby mode of a communication unit following an interrupt request without losing synchronization with other communication units, especially with a base station or master station. Thus, fast response of the communication system to user inputs is ensured even when extremely long idle state periods of a number of seconds are provided for energy saving reasons.

What is claimed is:

1. Method for interrupting an idle state of a communication unit in a communication system, especially in a radio communication system, in which, in response to an interrupt request, the time still remaining to the next activation is reduced to a time which is sufficient for preparing the activation only if the time still remaining is greater than a predetermined time that is at least sufficient for preparing the activation.

2. Method according to claim 1, characterized in that the time remaining following an interrupt request is set to a predetermined short time which is sufficient for preparing the activation.

3. Method for interrupting an idle state of a communication unit in a communication system, especially in a radio communication system, in which, in response to an interrupt request, the time still remaining to the next activation is reduced to a time which is sufficient for preparing the activation wherein the time still remaining is established in order to determine therefrom a subtraction value by which the time still remaining is reduced.

4. Method according to claim 3, wherein the time remaining following an interrupt request is set to a predetermined short time which is sufficient for preparing the activation.

5. Method for interrupting an idle state of a communication unit in a communication system, especially in a radio communication system, in which, in response to an interrupt request, the time still remaining to the next activation is reduced to a time which is sufficient for preparing the activation wherein the time still remaining of an idle state is detected as count of an idle state counter of a timer circuit, the count of which is set to a count which is closer to the target value in order to reduce the time still remaining.

6. Method according to claim 5, characterized in that the idle state counter is a counter which is clocked by a relatively slow clock and which, together with a frame counter clocked by a faster clock, establishes the idle state period, the frame counter establishing the idle state period remaining to the activation of the communication unit after the idle state counter has elapsed, and that, after the idle state counter has been set to a new count, the starting count of the frame counter is reset.

7. Method according to claim 6, characterized in that the new starting count is calculated in dependence on the shortening of the idle state time.

8. Method according to claim 5, wherein the time remaining following an interrupt request is set to a predetermined short time which is sufficient for preparing the activation.

* * * * *